United States Patent
Duennebier et al.

(10) Patent No.: US 9,338,480 B2
(45) Date of Patent: May 10, 2016

(54) SYSTEMS AND METHODS TO COMPENSATE FOR THE EFFECTS OF TRANSMISSION DELAY

(71) Applicant: Disney Enterprises, Inc., Burbank, CA (US)

(72) Inventors: David Andrew Duennebier, Burbank, CA (US); Samuel Joseph Reisner, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 202 days.

(21) Appl. No.: 13/782,401

(22) Filed: Mar. 1, 2013

(65) Prior Publication Data

US 2014/0250484 A1    Sep. 4, 2014

(51) Int. Cl.
| | |
|---|---|
| *H04N 21/214* | (2011.01) |
| *H04N 21/2187* | (2011.01) |
| *H04N 21/238* | (2011.01) |
| *H04N 21/24* | (2011.01) |
| *H04N 21/43* | (2011.01) |
| *H04N 21/61* | (2011.01) |
| *H04N 21/8547* | (2011.01) |
| *H04N 21/242* | (2011.01) |

(52) U.S. Cl.
CPC ....... *H04N 21/2146* (2013.01); *H04N 21/2187* (2013.01); *H04N 21/23805* (2013.01); *H04N 21/242* (2013.01); *H04N 21/2407* (2013.01); *H04N 21/4307* (2013.01); *H04N 21/61* (2013.01); *H04N 21/8547* (2013.01)

(58) Field of Classification Search
CPC .......... H04N 21/2187; H04N 21/4307; H04N 21/61; H04N 21/2146; H04N 21/23805; H04N 23/2407; H04N 21/242; H04N 21/8547

USPC ............................................ 725/98, 118, 148
See application file for complete search history.

(56) References Cited

U.S. PATENT DOCUMENTS

| | | | |
|---|---|---|---|
| 5,453,792 A | 9/1995 | Gifford et al. | |
| 5,995,153 A | 11/1999 | Moeller et al. | |
| 6,005,633 A * | 12/1999 | Kosugi | 348/518 |
| 6,195,387 B1 | 2/2001 | Moeller et al. | |
| 6,353,632 B1 | 3/2002 | Moeller et al. | |
| 7,092,774 B1 | 8/2006 | Gifford et al. | |
| 7,376,476 B2 * | 5/2008 | Gatts | 725/100 |
| 8,255,957 B1 * | 8/2012 | Mattox | 725/63 |
| 8,724,968 B2 | 5/2014 | Gifford et al. | |
| 2013/0279884 A1 | 10/2003 | Gifford | |
| 2005/0177855 A1 * | 8/2005 | Maynard et al. | 725/88 |
| 2005/0253965 A1 * | 11/2005 | Cooper | 348/515 |
| 2008/0075031 A1 * | 3/2008 | Ohayon et al. | 370/316 |
| 2008/0187009 A1 * | 8/2008 | Kim et al. | 370/517 |
| 2009/0180755 A1 * | 7/2009 | Kanemaru et al. | 725/134 |
| 2010/0037279 A1 * | 2/2010 | Francalanci et al. | 725/118 |
| 2011/0063499 A1 * | 3/2011 | Tanaka | 348/423.1 |
| 2011/0205427 A1 * | 8/2011 | Wang | 348/441 |
| 2013/0077699 A1 | 3/2013 | Gifford et al. | |

* cited by examiner

*Primary Examiner* — Randy Flynn
(74) *Attorney, Agent, or Firm* — McCormick, Paulding & Huber LLP

(57) ABSTRACT

According to some embodiments, systems, methods, apparatus and means are provided to determine an amount of a delay when transmitting a signal from a remote broadcast location to a studio location over a transmission link, operate a delay engine to insert the amount of the delay in a studio audio/video feed, and operate a switch to switch from the studio audio/video feed to a remote audio/video feed, the delay in the studio audio/video feed inserted prior to the switch.

24 Claims, 5 Drawing Sheets

SYSTEMS AND METHODS TO COMPENSATE FOR THE EFFECTS OF TRANSMISSION DELAY

FIELD

The present invention relates to systems and methods to compensate for satellite delay. More particularly, some embodiments relate to systems and methods to eliminate or substantially reduce the effects of transmission delay in broadcast programs.

BACKGROUND

It is common for broadcast programs to include situations where a show host or other speaker (referred to herein as "studio talent") interviews or speaks with a reporter or other individual (referred to herein as the "remote talent") at a remote site. Frequently, an irritating hesitation or delay occurs when the studio talent transfers or switches to the remote talent (which is commonly referred to as "throwing over" to the remote talent). This hesitation is primarily the result of delay caused by the distance the signal travels to the satellite and back, but is also compounded by digital technology which requires time to encode and decode the signal. The result is that when the studio talent throws to the remote talent there is an unnatural pause before viewers of the broadcast program see or hear a response from the remote talent.

For use in explaining issues associated with existing systems, reference is now made to FIG. 4 where a prior art representation of the timing and delays associated with a throw or switch to a remote broadcast feed from a studio broadcast are shown. In the illustrative figure, a top row 402' along a time axis represents a feed associated with a studio broadcast (in a theoretical time, with no delay) and a feed associated with a remote broadcast 404' (again, in the theoretical time, with no delay). In a theoretical timeline, with no delay, studio talent could ask a question 408, and receive an immediate response (with no delay) from remote talent (shown as an answer 410). In practice, however, a transmission delay occurs between the time when the studio talent throws in to the remote talent. The effects of this delay are shown in rows 402 and 406 where a time axis represents a feed associated with a studio broadcast from an absolute time perspective at 402, and a row 404 along the same time axis represents a feed associated with a remote broadcast (from the same absolute time perspective). If there were no transmission or encoding delays, the studio talent would ask a question 408 of remote talent and the remote talent would answer 410 with no delay. Once the answer 410 is received, a further question 412 could be presented and the remote talent would answer 414, again, without delay.

In practice, however, a transmission delay (which may include an encoding or other delay) exists between the studio and the remote talent. This is depicted along the row 406 (which is presented from the point of view of the studio broadcast location where the broadcast is produced). The delay results in a gap 416 between the time when the studio talent asks the question 408 and the remote talent provides an answer 410. The gaps 416 are typically filled with video of either the studio talent awaiting a response or the remote talent waiting for the question to be completed in order to begin a response. In either case, the gaps contain audio silence with video that can be described as a "blank stare" from the talent. The existence of the gap 416 can be disruptive and distracting to viewers of the produced program. It would be desirable to provide systems and methods to reduce or eliminate the effects of such a delay.

DETAILED DESCRIPTION

Figure 1:
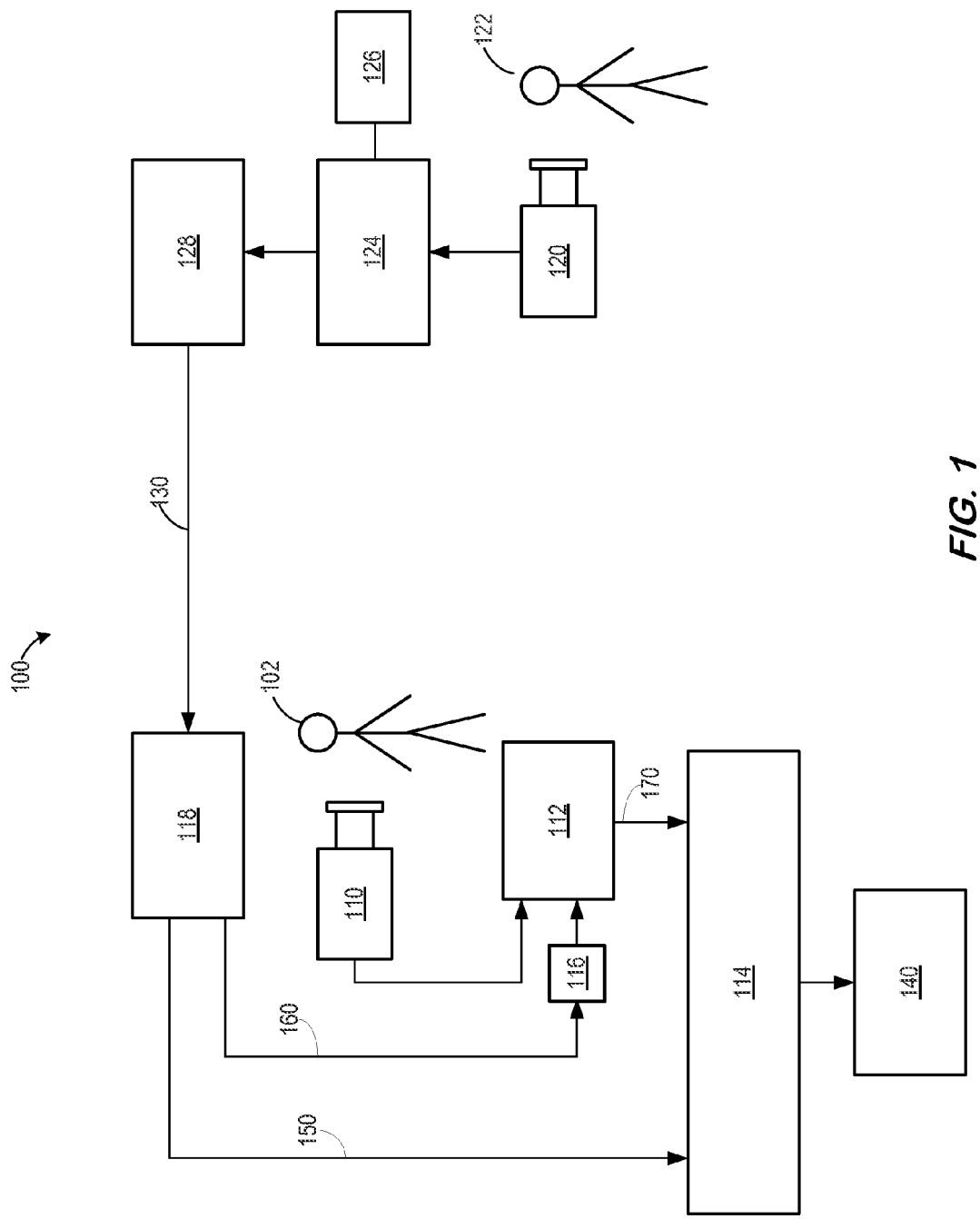
FIG. 1 is an illustration of a display including information from a local video camera and a remote video camera.

Applicant has recognized that there is a need for methods, systems, apparatus, means and computer program products to efficiently eliminate or reduce the delay that arises when a studio broadcast switches (or "throws") to a remote broadcast location. Pursuant to some embodiments, methods, systems, apparatus, means and computer program products are provided which determine an amount of a delay between a remote broadcast location and a studio, operate a delay engine to insert the amount of the delay in a studio audio/video feed, and operate a production switch to switch between the studio audio/video feed and a remote audio/video feed, the delay in the studio audio/video feed inserted prior to the switch.

Pursuant to some embodiments, the amount of delay is determined by comparing a timestamp received from the remote broadcast location with a second timestamp captured at the studio location, where the difference is used as the determined amount of delay. Pursuant to some embodiments, the delay engine is operated to select an insertion period for inserting the amount of the delay, where the delay is inserted over the course of the insertion period. In some embodiments, the amount of the delay is inserted by inserting a plurality of frames to a video signal of the studio audio/video feed, and by inserting audio content to an audio signal of the studio audio/video feed. In some embodiments, the frames inserted into the video signal and the audio content inserted into the audio may be selected or generated to substantially match or the video/audio signal to reduce the effect of switching from the studio audio/video feed to the inserted frames or content.

In some embodiments, a production switch is operated to switch from the remote audio/video feed back to the studio audio/video feed. In some embodiments, the delay engine is automatically reset (i.e., configured to begin re-inserting delay) after switching back to the studio audio/video feed.

Pursuant to some embodiments, the delay engine may also compress the studio audio/video feed. For example, the delay engine may be operated to compress the studio audio/video feed by an amount of time substantially equal to the amount of the delay and the delay engine may further be operated to control the production switch to switch from the remote audio/video feed to the studio audio/video feed, where the compression of the studio audio/video feed is performed prior to the switch.

Pursuant to some embodiments, systems, methods, apparatus and computer program code are provided which allow broadcast of a "split screen" including audio/video feeds from both a studio and one or more remote broadcast locations. Such embodiments may include determining an amount of a transmission delay when transmitting an audio/video signal from a remote broadcast location to a studio location over a transmission link. A delay engine is operated to insert an amount of compensation delay based on the determined amount of transmission delay in a studio audio/video feed, the compensation delay inserted upstream of a switch, and the delay engine is further operated to substantially remove the compensation delay from the studio audio/video feed. In some embodiments, multiple remote broadcast feeds may be received, and the amount of transmission delay inserted may be based on the amount of transmission delay associated with one of the remote video feeds (e.g., such as the remote video feed with the least amount of transmission delay).

For convenience and ease of exposition, a number of terms are used herein to describe features of some embodiments. For example, the term "studio broadcast" is used to refer to a broadcast program such as a news or other event produced at a broadcast location (such as, but not necessarily, a studio). The studio may be a fixed location or it may be a mobile location. The term "remote broadcast" is used to refer to a segment or portion of a broadcast captured at a location that is remote from the studio (e.g., such as an on-location shot of a news item, sporting event or the like, or a second studio remote from the first studio) or otherwise subject to a signal delay.

In general, as used herein, the term "remote" (when referring to a "remote broadcast") refers to the geographical or other separation of a remote broadcast location from a production control or studio location. Features of embodiments of the present invention provide particularly beneficial results when used in situations where the separation of the remote broadcast site from the production control or studio location involves use of a transmission channel which has a transmission delay (e.g., either as a result of the communications media, the geographical separation, or both) between the remote broadcast location and the production control or studio location.

The terms "throw," "throw to" or "throws to" are used to refer to the switching between a portion of the studio broadcast to a portion of the remote broadcast. For example, the term may refer to a point in time when studio broadcast talent switch to (or "throw to") talent at a remote broadcast site. As used herein, the term "transmission delay" or "delay" is used to refer to the delay between a remote broadcast location and a studio location, and the term may include both satellite or other transmission line delay as well as any encoding/decoding delay associated with delivery of the remote feed to a production or studio location. As used herein, the term "upstream" is used to refer to systems or devices prior to a component in the receipt or production of a feed. For example, inserting a compensation delay "upstream" of a switch refers to inserting a compensation delay prior to delivering the feed to a switching device.

As used herein, the phrase "video signal" may refer to any signal or feed conveying information about a moving image, such as a High Definition-Serial Digital Interface ("HD-SDI") signal transmitted in accordance with the Society of Motion Picture and Television Engineers 292M standard. Although HD signals may be described in some examples presented herein, note that embodiments may be associated with any other type of video feed, including a standard broadcast feed or a 3D image feed. Embodiments may be used with desirable results in a number of other types of video and audio environments. For example, embodiments may be used in Web video/audio environments such as a Skype® session or the like. Embodiments may be used in video/audio feeds delivered or consumed using Flash, MPEG4, RTMP or other digital or analog formats. While a broadcast environment is described herein, embodiments may be used to reduce the effect of transmission delay in other environments, such as video conference calls or the like.

Prior to providing a detailed description of some embodiments by reference to the figures, a brief introductory example illustrating the operation of some embodiments will first be provided. In the illustrative example, a television news program is produced at a studio location. The television news program includes newscasters in the studio (the "studio talent") as well as remote newscasters at one or more remote sites (each, the "remote talent"). During the broadcast program, the studio talent may choose or be prompted to throw to remote talent (e.g., to provide local or on the scene coverage of an event). In prior systems, when the studio talent throws to the remote talent, a slight delay or pause occurs, resulting from the transmission delay between the remote site and the studio. This delay is annoying to viewers and can cause the studio talent to talk over or interrupt the remote talent.

Figure 5:
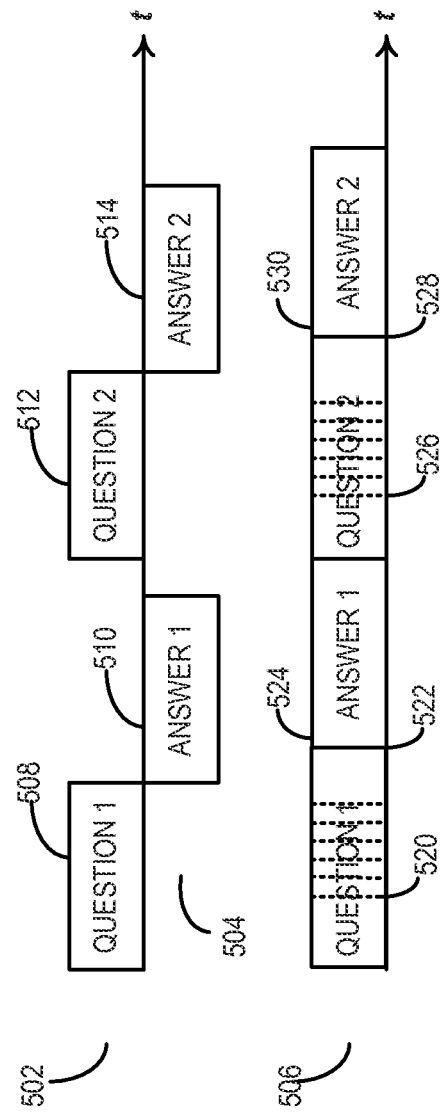
FIG. 5 is an example illustration of a timeline associated with a switch between a studio and a remote broadcast location pursuant to some embodiments.

For use in illustrating features of some embodiments, reference is now made to FIG. 5, where an illustrative timing diagram is shown which results from use of features of the present invention. As shown in FIG. 5, studio talent (shown from the perspective of the studio talent at 502) asks a question of talent at a remote broadcast location (shown from the perspective of the remote talent at 504). Due to a transmission delay between the remote location and the studio, the feed from the studio is delayed (from the perspective of the studio location 506). Pursuant to some embodiments, the effects of this delay are minimized or substantially reduced by application of techniques described further herein. In particular, as shown in FIG. 5, at 520 a delay is applied to an expander device which causes a number of video frames (and audio content) to be inserted into the studio feed (illustrated as the dashed lines in questions 1 and 2). The amount of delay applied is based on the amount of transmission delay between the remote location and the studio and may be applied as described further herein. The inserted video frames and audio content cause the question segments to imperceptibly extend such that there is substantially no (or a reduced) gap between the question segment and the answer received from the remote location, providing a more desirable viewer experience. Pursuant to some embodiments, at 524, the delay engine may be placed in a mode where it returns to a state with no delay (e.g., by switching its output to pass through the non-delayed studio feed). In some embodiments, at 524, the expander compresses the content (e.g., by removing audio content and video frames) to create a smooth transition to the no-delay state. At 526, when another remote segment is to occur, the delay may be initiated again, causing additional frames and content to be inserted into the studio segment (shown as question 2). In this manner, embodiments allow segments that include one or more remote location "throws" to be broadcast without disruptive or distracting gaps between the studio segments and the remote segments. Further details of the implementation of techniques to eliminate or substantially reduce such gaps or delays will now be described by reference to FIG. 1.

FIG. 1 is a block diagram of a system 100 in accordance with some embodiments of the present invention. In general, the components depicted on the left hand side of the block diagram relate to components operated at or under control of a production or broadcast studio, while the components depicted on the right hand side of the block diagram relate to components operated at or under control of a remote broadcast location. While a single remote broadcast location is shown, in practice, a number of different remote broadcast locations may be in communication with a production or broadcast studio during production of a broadcast.

The system 100 includes one or more local or studio video cameras 110 aimed at studio talent 102. For clarity and ease of exposition, a single studio video camera is shown—those skilled in the art will appreciate that in many situations, multiple studio video cameras may be used. The studio video camera 110 might comprise, for example, an instrumented hard camera that can be dynamically adjusted (e.g., via pan or tilt motions). Those skilled in the art will appreciate that in many implementations separate audio capture devices and microphones may be provided, however, for ease of exposition, the video cameras described herein are described as capturing both the video and the audio data. The studio video cameras 110 provide captured video and audio data to one or more expanders 112 (the operation of which will be described further herein). In general, the production or broadcast studio operates a control room 114 (which may include one or more switchers, mixers or the like) to combine video and audio data received from both the studio cameras 110 and the remote location to produce a program for broadcast and distribution (by distribution systems 140). The program may include video and audio from the remote broadcast location such that any apparent transmission delay associated with the remote broadcast location is removed or substantially reduced as described further herein.

The system 100 also includes one or more remote video cameras 120 aimed at one or more remote subjects 122 (e.g., remote talent at a remote location). Again, for clarity and ease of exposition, only a single remote video camera is shown—those skilled in the art will appreciate that in many situations, multiple remote video cameras (including multiple remote video cameras at multiple remote locations) may be used. The remote video camera 120 might comprise, for example, a lockoff camera that transmits a remote video HD-SDI feed directly to the studio over a communication channel 130 (e.g., such as a fiber or satellite connection). In situations where multiple remote video cameras 120 are used, a switcher 124 may be provided at the remote location. A number of different camera devices may be used in conjunction with embodiments of the present invention, so long as the camera (or ancillary hardware) allows a video and audio signal to be transmitted to a studio or broadcast center over a connection such as fiber or satellite connection 130. The video and audio data are provided to standard encoders and multiplexors 128 for encoding and transmission over the communication channel 130 to a production control facility or studio location remotely located from the remote site.

In general, the camera crew and camera equipment at the remote site function in the normal manner, with the cameramen shooting the event with each remote video camera 120, microphone and camera rigs operated as normal. The video and audio data from each remote video camera 120 may be switched and controlled using one or more conventional switchers 124 located at the remote site. In some embodiments, the video and audio data from a remote video camera 120 may be transmitted directly from the video camera 120 to the production facility or studio over communication channel 130 (e.g., no switcher 124 need be provided in some situations).

Pursuant to some embodiments, a timestamp 126 is captured at the remote site and the timestamp is communicated to the production control facility or studio location for use in determining an amount of the delay between the remote site and the studio. For example, the amount of the delay may be determined by determining how long it takes for a signal to propagate from the remote location across the communication channel 130 to the production facility or studio location. This measurement or determination may be performed, in some embodiments, by generating a timestamp 126 at the remote broadcast location. In some embodiments, the timestamp is generated using a global positioning satellite ("GPS") receiver located at the remote site. A GPS clock is an example of a clock signal that can be used as an absolute reference by both the studio and the remote location. The timestamp 126 may be provided to the switcher 124 for transmission to the production facility or studio location using known techniques for encoding time stamps in audio/video signals. In some embodiments, the timestamp 126 may be obtained by the video camera 120 and transmitted directly to the production facility or studio location from the camera 120 or from a device associated with the video camera 120. In some embodiments, a timestamp may first be captured at the studio location and then transmitted to the remote site for a determination of the amount of delay.

Upon receipt of the timestamp, the production facility or studio location may determine the amount of the transmission delay by comparing the received timestamp to a timestamp taken at the production facility or studio location. The difference between the two times may be set as the amount of the encoding/transmission delay for use in reducing the effects of the delay pursuant to the present invention. This measurement or determination of the transmission delay may be performed for each remote broadcast. Further, this measurement or determination of transmission delay may be updated periodically for each remote broadcast (e.g., a timestamp may be sent on a periodic basis to allow the production facility or studio to determine or estimate the current size of the delay to account for atmospheric or other conditions that may affect the transmission delay). Those skilled in the art will appreciate that other approaches may be used to determine the size of the transmission delay. In some embodiments, a delay engine 116 may be used to calculate the amount of the delay based on the received timestamp 126 and a timestamp taken at the studio location.

Upon receipt of the encoded video and audio data, the production control facility or studio location decodes the data using one or more decoders 118. Pursuant to some embodiments, the decoders 118 further include components to split the received timestamp or delay information and to provide the timestamp or delay information as a further input to the delay engine 116. The decoded video and audio data are provided to a control room 114 (e.g., for mixing, switching and other standard processing).

The expander 112 may be, for example, a Time Tailor device available from Prime Image Delaware, Inc. Pursuant to some embodiments, the expander 112 receives video and audio data from one or more studio cameras 110 as well as information identifying a measured or detected delay (shown as item 160). The information identifying the measured or detected delay (referred to herein as the "amount of the delay" associated with the communication link) may include, for example, the timestamp information received from the remote broadcast location and the delay engine 116 may operate on the information to calculate the delay as an input to the expander 112. Alternatively, the information identifying the measured or detected delay may include a delay amount calculated prior to input to the expander 112. In some embodiments, an operator may manually enter information identifying the measured or detected delay. For example, if a comparison of a GPS timestamp captured at the remote broadcast location and a GPS timestamp captured at the studio reveals a 2 second delay between the remote location and the studio location, an operator may enter a delay amount of 2 seconds into the expander 112. In some embodiments, the delay data and other configuration data used to operate and control the expander 112 is stored in a database such as the database shown in FIG. 3. In some embodiments, the data (such as the amount of the delay) is calculated by the delay engine 116 and automatically stored in a database such as the database of FIG. 3.

The expander 112 is then configured to add frames to the video signal and audio content to the audio signal received from the studio video cameras 110. For example, the expander 112 may be configured to add an amount of video frames and audio content to expand the signals from the studio in an amount substantially equal to the amount of the delay (as measured between the remote site and the studio and received as signal 160). A number of techniques for inserting video frames and audio content are described in U.S. Pat. No. 7,092,774 assigned to Prime Image, Inc., the contents of which are hereby incorporated by reference in their entirety. Pursuant to some embodiments, the expander 112 may be configured to insert these additional video frames and audio content over a desired period of time (which may be configured by an operator of the system or programmatically based on the application of one or more rules associated with the length of the delay received at 160). For example, in a situation where the delay is 2 seconds, the desired period of time over which to insert the additional frames and content may be 30 seconds. That is, a plurality of small, visually undetectable frames and audio content, having a total length of 2 seconds, may be inserted into the video and audio signals received from the studio video camera 110 over a period of 30 seconds. Pursuant to some embodiments, the desired period of time is automatically calculated by the expander 112 based on input of the desired delay (from signal 160).

The expander 112 then outputs an expanded signal after having inserted the additional frames and content. The expanded signal is provided to the control room 114 for switching and further processing. In particular, pursuant to some embodiments, the control room operates one or more switchers (not shown) to switch between broadcasting the expanded signal to broadcasting the remote audio and video received from the remote broadcast location (shown as signal 150). Because the remote audio and video has a delay associated with it, if the control room 114 switched to the remote audio and video directly from the non-expanded video and audio signal, viewers of the broadcast program would experience a noticeable and irritating delay or lag. However, pursuant to some embodiments, the control room instead switches between broadcasting the expanded signal (received from the expander 112) and the remote audio and video. As a result, viewers of the broadcast program experience little to no delay or lag when the control room throws from the studio broadcast to the remote broadcast. Pursuant to some embodiments, the expander 112 may be placed in a no-delay mode during or after the time when the control room throws or switches to the remote broadcast. Once placed in the no-delay mode, the expander 112 effectively acts as a video and audio pass through such that the output of the expander 112 is substantially equivalent to the input of the expander 112 (e.g., the output of the expander 112 is substantially the real time signal received from the studio video cameras 110). In this manner, when the control room completes the remote portion of the segment (e.g., when the control room throws back to the studio talent), the delay has been removed.

While the delay engine 116 is shown as a separate device from the expander 112, in some embodiments, the functionality of the delay engine 116 and expander 112 may be combined in a single platform. As a result, the combined functions of the delay engine 116 and the expander 112 may be referred to herein simply as the "delay engine 116".

Figure 2:
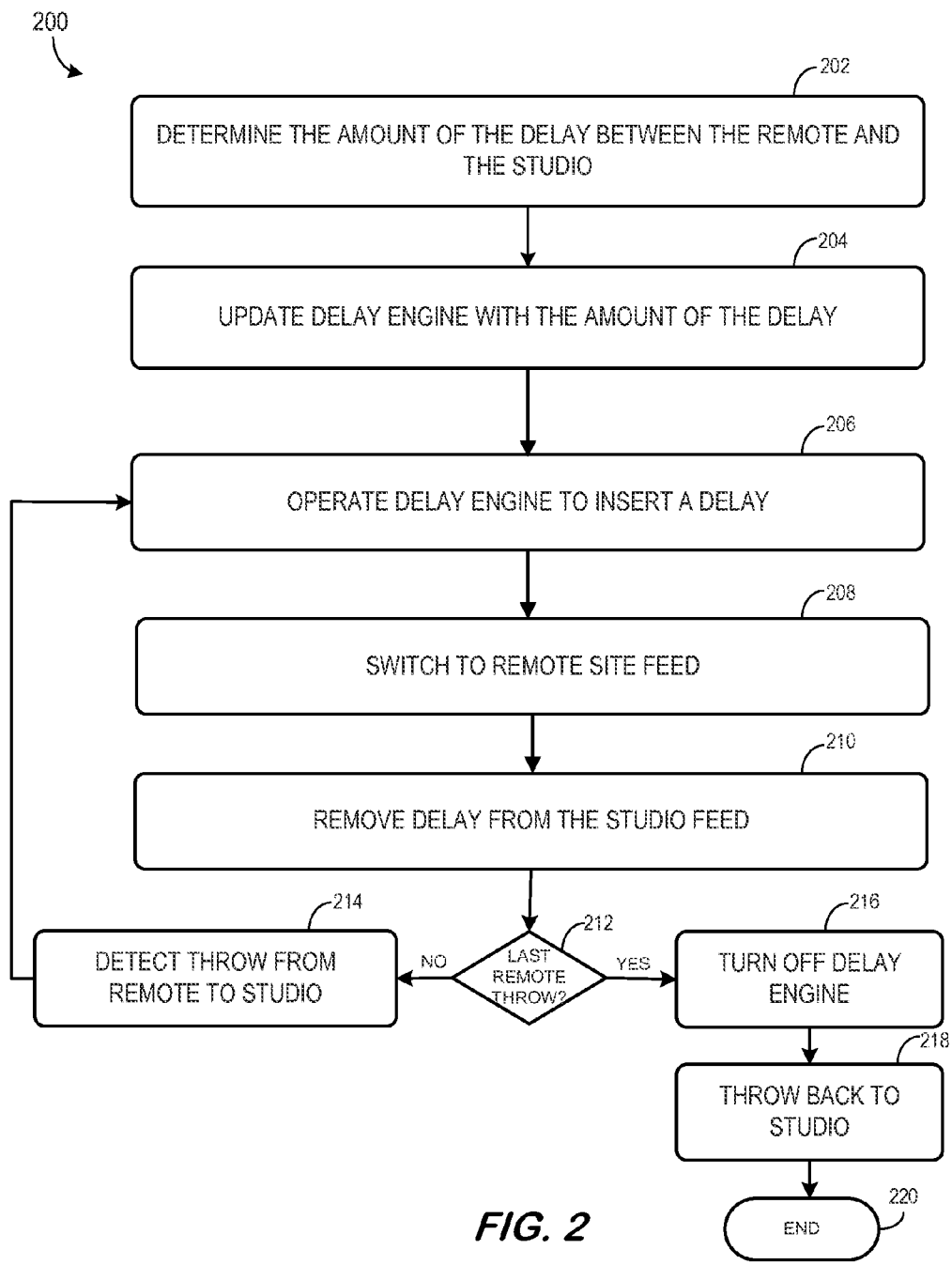
FIG. 2 is a flow chart of a method in accordance with some embodiments of the present invention.

Further features of the operation of a system pursuant to the present invention will now be described by reference to FIG. 2 which is a method that might be performed, for example, by some or all of the elements described herein. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

Pursuant to some embodiments, the process 200 may begin at 202 where the amount of the delay between the remote location and the studio is determined. For example, this determination may be made by operating a GPS receiver at the remote location to obtain a timestamp, and then transmitting a message including the timestamp to the studio over the communication link to be used for transmitting video and audio data during the broadcast. One or more devices at the studio (such as the delay engine 116) may then compare the received timestamp with a timestamp taken at the studio location upon receipt of the remote time stamp (again, for example, using a GPS receiver) and use the timestamp information to calculate the amount of the delay between the remote site and the studio. In some embodiments, the determination of the amount of the delay at 202 may be repeated on a regular basis (e.g., every 15 minutes, every hour, or the like) to ensure that a current value of the delay amount is known. Pursuant to some embodiments, the GPS receiver used to capture the timestamp at the remote location may be provided as an accessory or module attached to or in communication with a video camera or other device at the remote site allowing efficient capture and transmission of the timestamp to the studio. The delay could also be determined by user experimentation or estimation.

Once the amount of the delay is determined, processing continues at 204 where the amount of the delay is entered into a delay engine (such as item 116 of FIG. 1). For example, processing at 204 may include an operator manually entering one or more delay engine configuration settings into delay engine 116, including a setting indicating the amount of the delay associated with one or more remote broadcast sites. These configuration settings may be applied each time a remote broadcast is expected during the broadcast of a program or on a daily or other periodic basis. In some embodiments, the configuration settings may be dynamically updated as new information is received from remote sites (for example, if the timestamp information received from one remote site indicates that the amount of delay associated with that site has changed, the configuration settings may be updated to reflect the current amount of delay associated with that site). In some embodiments, where multiple remote sites may be associated with a single broadcast (e.g., the studio expects to throw to several different remote sites during a broadcast), each remote site may have a different amount of delay entered into the delay engine 116. An example database table showing sample configuration settings is shown as FIG. 3, which will now be referenced.

Figure 3:
FIG. 3 is a tabular representation of a portion of a configuration table in accordance with some embodiments of the present invention.
Figure 4:
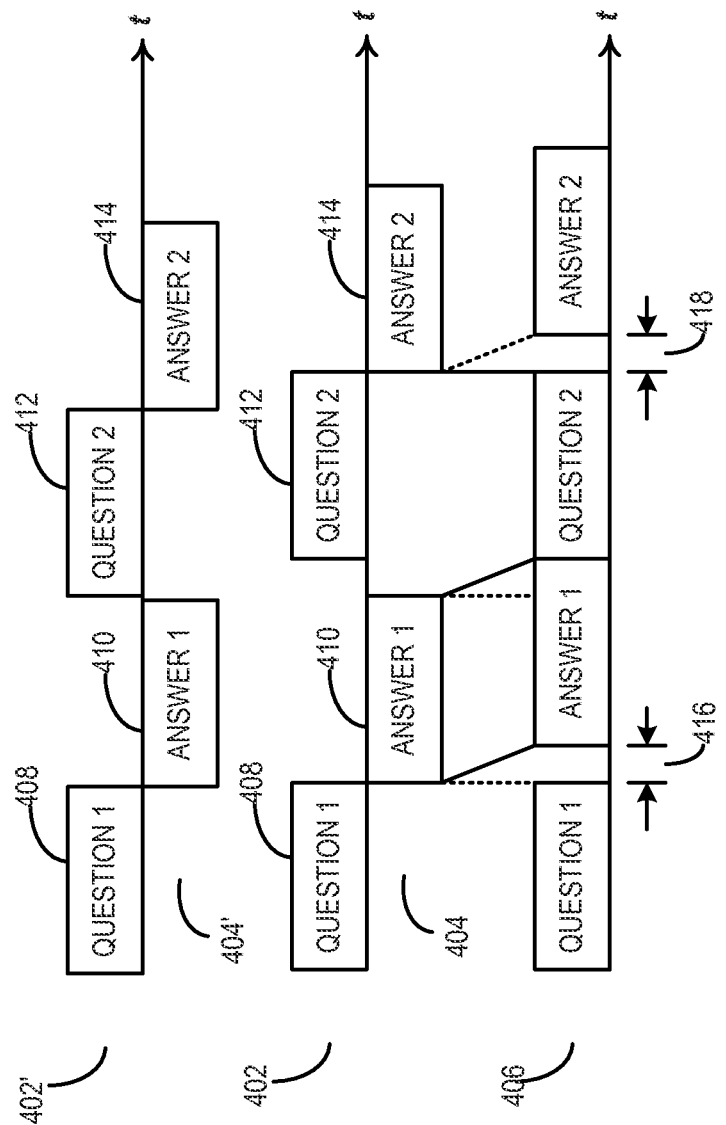
FIG. 4 is an example illustration of a prior art timeline associated with a delay in a switch between a studio and a remote broadcast location.

As shown in FIG. 3, a database 300 may be stored at or accessible to delay engine 116 to allow the configuration and operation of expander 112 pursuant to the present invention. The illustration and accompanying description of the database presented herein is exemplary, and any number of other database arrangements could be employed besides those suggested by the figure. For example, different databases associated with different types of delay, or expander configuration data might be stored at (or accessible to) the delay engine 116.

FIG. 3 is a tabular view of a portion of a delay configuration database 300 in accordance with some embodiments of the present invention. The table includes entries associated with individual remote broadcasts, each identified by a remote broadcast identifier 302. For example, a remote broadcast identified by an identifier 302 may be an on-location news spot scheduled to be thrown to during a news broadcast program. Each remote broadcast may be associated with information used to control the operation of the expander 112 pursuant to the present invention. For example, data may be stored including a time stamp 304 received from the remote broadcast location, an amount of delay 306 (e.g., which may be calculated prior to storage in the database or which may be calculated based on other information stored or accessible to the database), an insertion period 308 (e.g., a calculated or predetermined amount of time over which the expander 112 is to operate to insert frames and blank sound to insert the amount of delay identified at 306), and a flag 308 or other indicator identifying whether the delay is currently active (e.g., whether the expander 112 is currently operating to insert the delay 306 over the insertion period 308). The data in database 300 may be entered manually (e.g., to add a new identifier 302 during preproduction of a broadcast program), or may be obtained automatically. Pursuant to some embodiments, data stored in database 300 may be used to directly or indirectly control the operation of the expander 112 as described herein.

Referring again to FIG. 2, once the delay engine has been updated with the amount of the delay, processing continues at 206 where the delay engine is operated to insert a delay equivalent to the amount of delay determined at 202. Processing at 206 may occur some period of time after processing at 202. For example, a remote broadcast crew may set up early in the day and the measurements required to determine the amount of delay may be obtained at that time. The remote broadcast may occur later in the day, and processing at 206 may occur near or a short period prior to the time that the remote broadcast is scheduled to be thrown to from the studio. In some embodiments, processing at 206 may be set as a configuration setting and stored in the database shown in FIG. 3 (e.g., if a remote broadcast will be thrown to at a specific time, the time may be set in the database of FIG. 3). In many situations, however, it is more likely that an operator or member of the production crew will interact with the delay engine to cause operation at 206. Processing at 206 includes operating the expander 112 to insert the amount of delay into the video and audio feed from the studio. Pursuant to some embodiments, the amount of the delay may be inserted over a predetermined period of time (e.g., the "insertion period" shown in FIG. 3) to ensure that the blank frames and audio segments are inserted in an unobtrusive manner. Once the selected amount of delay has been added over the insertion period, the delay engine stops adding additional frames and audio content and the studio feed is broadcast with a constant level of delay until a throw to a remote feed.

In some embodiments, processing at 206 may be automatically triggered by certain actions. For example, when a studio segment is switched to air, and a remote segment is planned to occur during that studio segment, the appropriate delay may be inserted once the studio segment is switched to air. This may be detected, for example, through a hardware or software interface between a control room switcher and the delay engine. In this manner, the control room may throw to the remote segment at any time during the studio segment, and the delay will have been inserted.

The automatic triggering may, for example, be triggered by monitoring the audio levels of both the studio and remote feeds. When the studio feed contains audio exceeding a predetermined level and the remote feed is silent, the insertion of the delay 206 would be triggered. When the remote audio feed contains sound, this would indicate that a switch to a remote site feed 208 as the broadcast stream has occurred. The delay engine would then operate to "remove" the delay 210 (e.g., using compression techniques to "reverse" the delay insertion in the studio feed). As used herein, "removing" a delay means compensating for an inserted delay by returning a signal stream to substantially its original or "real time" status. The term "removing" or "reversing" a delay does not imply that the precise delay elements that were previously inserted are removed.

The automatic triggering may also be triggered by monitoring the audio levels of just the studio feed. When the studio feed contains audio, the insertion of the delay 206 would be triggered. When the studio audio feed goes silent, the delay would be removed 210.

Determining whether audio is present can use one of several techniques. For example, one embodiment uses predetermined threshold parameters for audio level and duration of audio above that level. In some embodiments, these parameters may be configurable by the user. In some embodiments, the triggering mechanism may be built into the same device as the delay engine, but it may also be implemented in a separate device. The audio levels fed for monitoring may need to be specific signals (isolated microphone feeds, for example), so that other audio elements (music and sound effects, for example) will not affect the monitoring.

Once processing at 206 is substantially complete, the control room at the studio or production location can "throw to" or switch to the remote broadcast feed 208 (e.g., control room 114 may switch the broadcast stream from the studio feed to the remote feed 150). Because the studio feed was delayed by an amount equivalent to the amount of delay, when the control room 114 throws to the remote feed 150, there is little to no noticeable delay or interruption before the video and audio from the remote feed start to be broadcast. In some embodiments, both the delayed studio feed and the live studio feed may be viewed by a director or production staff (e.g., in the control room).

As described above, once a switch to a remote feed 208 is detected or otherwise indicated (e.g., by a manual input), the delay engine operates to remove the delay from the studio feed 210. This may be performed by simply switching the stream being passed through the delay engine to the non-delayed signal being fed into the delay engine, using a compression technique, or simply bypassing the delay engine and switching to the non-delayed studio feed. Employing a compression technique is especially useful in embodiments where the broadcast is using a "split screen" format where both the remote talent and the studio talent can be seen simultaneously, as it avoids a "jump" effect in the video that could occur when the delay is removed suddenly. In embodiments where the full screen is cutting between the two feeds, a "jump" in the non-broadcast feed does not affect the viewer experience.

In step 212, it is determined whether the previous throw to the remote feed is the last remote throw for the broadcast segment. If it is not the last throw, the system waits to detect a throw from the remote feed back to the studio feed. When this throw is detected 214 (e.g., by receiving a signal, detecting a broadcast camera change via an interface with the switcher, audio detection, manual input, etc.) the delay engine is placed in "reset" mode by looping the process back to step 206 to trigger the delay engine to again insert the delay over the insertion period. If, in step 212, it is determined that the previous remote throw was the last throw for the segment, the delay engine is disabled 216 (e.g., turned off, bypassed, etc.) so as to not insert any delay, even when the broadcast feed is switched back to the studio feed 218.

In some embodiments, the delay engine 116 may be provided with a switching device to enable or disable the delay mechanism of the present invention. In such embodiments, when the delay engine 116 is disabled, the feed from the studio camera(s) are effectively passed directly to the control room 114 without any delay. When the delay engine 116 is enabled, the delay engine 116 is operable pursuant to the present invention (e.g., it may be set to insert an amount of a delay pursuant to the present invention). If the switching device is set to disable while a delay is active, the delay engine 116 would be transitioned to a state with no delay.

Pursuant to some embodiments, similar techniques may be used to improve the transition when the remote talent throws back to the studio talent. For example, in some embodiments, the expander 112 may be operated to remove frames and audio, effectively compressing the studio audio and video feed. For example, the amount of the delay (such as item 306 of FIG. 3) may be used to control the expander 112 to compress the studio feed (e.g., if there is a delay of 2 seconds between the studio and the remote site, the studio feed may be compressed by 2 seconds or less). By compressing the studio feed, the perceived interruption or delay when switching back to the studio is reduced, providing an improved viewing experience. This effectively synchronizes the studio feed and the remote feed, allowing, for example, split screens to be used. In a split screen, one portion of the screen may display the feed from the studio, while a second portion of the screen may display the feed from the remote site (or even multiple remote sites). In split-screen or "multiple window" embodiments, the "throws" are not detected via broadcast camera detection since both cameras are broadcast concurrently, therefore manual or audio detection may be used to determine when the throws occur.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although a single studio camera and location and a single remote camera and location have been described in some of the examples presented herein, note that any number of cameras or locations may be supported in accordance with the present invention. Moreover, although specific hardware and data configurations have been described herein, note that any number of other configurations may be provided in accordance with embodiments of the present invention (e.g., some of the signals and data described herein may be split, combined, or handled by external systems). Further note that embodiments may be associated with any number of different types of broadcast programs (e.g., sports, news, and weather programs).

Although a single remote feed is described, and a single "throw" from the studio to the remote is described, embodiments may be used with desirable results with multiple remote feeds and multiple throws. For example, in some embodiments, features of the present invention may be used to provide a split screen broadcast that includes two or more remote feeds. Each of the remote feeds may have a different transmission delay, and embodiments may compensate for those delays using features of the present invention. As a simple example, the shortest delay associated with the different remote feeds may be used as the amount of the delay used to control the expander 112. That is, in some embodiments, an amount of video frames and audio content substantially equivalent to the shortest delay of the different remote signals may be added to expand the signals from the studio when throwing to the multiple remote locations.

Further, although embodiments have been described herein in a video environment, embodiments may also be used with desirable benefits in audio-only environments (e.g., such as radio broadcasts, voice teleconferences, call center applications, or the like).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method comprising:
   determining an amount of a transmission delay when transmitting an audio/video signal from a remote broadcast location to a studio location over a transmission link;
   operating a delay engine to insert in a studio audio/video feed an amount of compensation delay based on the determined amount of transmission delay and associated with a remote audio/video feed;
   operating a switch to switch from the studio audio/video feed to the remote audio/video feed, the compensation delay associated with the remote audio/video feed inserted in the studio audio/video feed upstream of the switch, wherein the insertion of the compensation delay associated with the remote audio/video feed is automatically triggered by one of:
      switching the studio audio/video feed to air, and
      detecting an audio level of the studio audio/video feed; and
   determining whether the switch from the studio audio/video feed to the remote audio/video feed is a last switch to the remote audio/video feed for a broadcast, and
   disabling the delay engine based on the determination the switch from the studio audio/video feed to the remote audio/video feed is the last switch.

2. The method of claim 1, wherein the determining an amount of a delay further comprises:
   receiving, from the remote broadcast location, a first timestamp captured at the remote broadcast location and transmitted to the studio location over the transmission link; and
   comparing the timestamp received from the remote broadcast location with a second timestamp captured at the studio location to determine a difference between the first and second timestamps, the difference used as the determined amount of the delay.

3. The method of claim 1, further comprising:
   operating the delay engine to select an insertion period for inserting the delay, wherein the operating the delay engine to insert the amount of the delay in a studio audio/video feed further comprises inserting the amount of the delay over the insertion period.

4. The method of claim 3, wherein the amount of the delay is inserted by inserting a plurality of frames into a video signal of the studio audio/video feed and inserting a segment of audio into an audio signal of the studio audio/video feed.

5. The method of claim 1, wherein the delay engine includes a configuration file and a signal expander.

6. The method of claim 1, further comprising:
operating a switch to switch an output camera source from the remote audio/video feed to the studio audio/video feed.

7. The method of claim 6, further comprising:
after operating the switch to switch from the remote audio/video feed to the studio audio/video feed, resetting the delay engine to insert the amount of compensation delay into the studio audio/video feed.

8. The method of claim 7, wherein the resetting the delay engine is performed automatically upon operating the switch to switch from the remote audio/video feed to the studio audio/video feed.

9. The method of claim 7, wherein the resetting the delay engine is performed by:
monitoring an audio feed from at least one of the studio location and the remote broadcast location; and
resetting the delay engine upon detection of a change in a level of the audio feed that exceeds a predetermined threshold.

10. The method of claim 1, further comprising:
the operating the delay engine to compress the studio audio/video feed by an amount of time substantially equal to the amount of the delay; and
resetting the delay engine to begin inserting the compensation delay when a signal is received confirming that the switch has switched from the remote audio/video feed to the studio audio/video feed.

11. The method of claim 1, wherein the transmission link is at least one of: (i) a fiber cable or (ii) a satellite transmission.

12. The method of claim 1, wherein the compensation delay associated with the remote audio/video feed is inserted while the studio/video feed is switched to air.

13. The method of claim 1, wherein the disabled delay engine avoids insertion of the compensation delay.

14. A delay engine, comprising:
a communication device to receive timestamp data from a remote location over a transmission network;
a processor coupled to the communication device; and
a storage device in communication with the processor and storing instructions adapted to be executed by the processor to:
determine an amount of delay between the timestamp data and receipt of the timestamp data over the transmission network;
insert in a first audio/video feed a compensation delay associated with a second audio/video feed received from the remote location to compensate for the amount of transmission delay, the amount of the compensation delay in the first audio/video feed received from at least a first camera located at a studio location, wherein the insertion of the compensation delay is automatically triggered by one of: switching the first audio/video feed to air prior to insertion of the compensation delay, and detecting an audio level of the first audio/video feed prior to insertion of the compensation delay;
cause a video production switch to switch from broadcasting the first audio/video feed to broadcasting the second audio/video feed received from the remote location over the transmission network, the amount of the delay inserted in the first audio/video feed upstream of the switch;
determine whether the switch from broadcasting the first audio/video feed to broadcasting the second audio/video feed is a last switch to the second audio/video feed for a broadcast; and
disable the delay engine based on the determination the switch from the first audio/video feed to the second audio/video feed is the last switch.

15. The delay engine of claim 14, wherein the instructions adapted to be executed by the processor to determine an amount of a delay further comprise instructions to:
compare the timestamp data received over the transmission network with a second timestamp captured at a location associated with the delay engine to determine a difference between the first and second timestamps, the difference used as the determined amount of the delay.

16. The delay engine of claim 14, wherein the instructions adapted to be executed by the processor further comprise instructions to:
select an insertion period for inserting the amount of the delay, wherein the instructions to insert the amount of the delay further comprise inserting the amount of the delay over the insertion period.

17. The delay engine of claim 16, wherein the instructions adapted to be executed by the processor further comprise instructions to:
insert a plurality of frames into a video signal of the first audio/video feed and inserting an audio segment into an audio signal of the first audio/video feed.

18. The delay engine of claim 17, wherein the instructions adapted to be executed by the processor further comprise instructions to:
reset the delay engine after the switch from the second audio/video feed to the first audio/video feed.

19. The delay engine of claim 18, wherein the reset is performed automatically.

20. The delay engine of claim 18, wherein the reset of the delay engine is performed by:
monitoring an audio feed from at least one of the remote location and the studio location; and
resetting the delay engine upon detection of a predetermined change in a level of the audio feed.

21. The delay engine of claim 14, wherein the instructions adapted to be executed by the processor further comprise instructions to:
reset the delay engine when a signal is received confirming that the video production switch has switched from the first audio/video feed to the second audio/video feed;
compress the first audio/video feed by an amount of time substantially equal to the amount of the delay; and
cause the video production switch to switch from the second audio/video feed to the first audio/video feed, the compression of the first audio/video feed performed prior to the switch.

22. A method, comprising:
measuring an amount of a first transmission delay between a first remote location and a broadcast location;
measuring an amount of a second transmission delay between a second remote location and the broadcast location;
operating a delay engine to insert an amount of compensation delay in a studio feed, the amount of compensation delay based on the lesser of the first transmission delay and the second transmission delay, wherein the insertion of the compensation delay is automatically triggered by one of: switching the studio feed to air, and detecting an audio level of the studio feed;

operating a switch to switch from the studio feed to a composite feed including a feed from the first remote location and a feed from the second remote location, wherein the compensation delay is inserted in the studio feed upstream of the switch;

determining whether the switch from the studio audio/video feed to the composite feed is a last switch to the composite feed for a broadcast, and disabling the delay engine based on the determination the switch from the studio audio/video feed to the composite feed is the last switch.

23. The method of claim 22, wherein the studio feed and the feed from at least one of the first and second remote locations includes video and audio data.

24. A method comprising:

determining an amount of a transmission delay when transmitting an audio/video signal from a remote broadcast location to a studio location over a transmission link;

operating a delay engine to insert in a studio audio/video feed an amount of compensation delay based on the determined amount of transmission delay and associated with a remote audio/video feed, the compensation delay inserted upstream of a switch, wherein the insertion of the compensation delay is automatically triggered by one of: switching the studio audio/video feed to air, and detecting an audio level of the studio audio/video feed;

operating the delay engine to substantially remove the compensation delay from the studio audio/video feed; and disabling the delay engine based on a determination a switch from the studio audio/video feed to the remote audio/video feed is a last switch.

* * * * *